United States Patent [19]

Olesen

[11] Patent Number: 4,866,787

[45] Date of Patent: Sep. 12, 1989

[54] CHANNEL STRIP FOR USE IN A SATELLITE/HYBRID TELEVISION SYSTEM

[75] Inventor: Lykke Olesen, Soder Malarstrand 41, S-117 25 Stockholm, Sweden

[73] Assignee: Lykke Olesen, Sweden

[21] Appl. No.: 43,392

[22] Filed: Apr. 28, 1987

Related U.S. Application Data

[63] Continuation-in-part of Ser. No. 807,238, Dec. 10, 1985, Pat. No. 4,675,732.

[30] Foreign Application Priority Data

Dec. 19, 1984 [SE] Sweden ................................ 8406489

[51] Int. Cl.$^4$ ........................ H04N 7/10; H04H 1/02
[52] U.S. Cl. .......................................... 455/3; 455/6; 455/12; 455/349; 455/4; 358/86
[58] Field of Search ...................... 455/151, 3, 4, 5, 6, 455/12, 179, 187, 327, 347–349, 74, 338; 358/114, 86

[56] References Cited

U.S. PATENT DOCUMENTS

| | | |
|---|---|---|
| Re. 31,639 | 7/1984 | Nicholson . |
| 2,697,746 | 12/1954 | Kennedy . |
| 3,581,209 | 5/1971 | Zimmerman . |
| 3,987,398 | 10/1976 | Fung . |
| 4,009,441 | 2/1977 | Kumagai et al. . |
| 4,035,838 | 7/1977 | Bassani et al. . |
| 4,131,851 | 12/1978 | Martiny et al. .................. 455/349 X |
| 4,135,157 | 1/1979 | den Toonder . |
| 4,156,847 | 5/1979 | Tazawa et al. . |
| 4,191,966 | 3/1980 | Ovnick, Jr. . |
| 4,211,894 | 7/1980 | Watanabe et al. . |
| 4,302,771 | 11/1981 | Gargini . |
| 4,343,042 | 8/1982 | Schrock et al. .................. 455/349 X |
| 4,345,273 | 8/1982 | Barabas et al. . |
| 4,381,522 | 4/1983 | Lambert . |
| 4,425,579 | 1/1984 | Merrell . |
| 4,425,639 | 1/1984 | Acampora et al. . |
| 4,475,123 | 10/1984 | Dumbauld et al. . |
| 4,475,187 | 10/1984 | Barabas . |
| 4,509,208 | 4/1985 | Sogo et al. ........................ 455/327 X |
| 4,518,993 | 5/1985 | Okada et al. ..................... 358/86 X |
| 4,523,190 | 6/1985 | De Roo . |
| 4,532,543 | 7/1985 | Groenewegen ........................ 358/86 |
| 4,538,174 | 8/1985 | Gargini et al. . |
| 4,538,175 | 8/1985 | Balbes et al. ........................... 358/86 |
| 4,592,093 | 5/1986 | Ouchi et al. . |
| 4,602,279 | 7/1986 | Freeman .................................. 358/86 |
| 4,616,256 | 10/1986 | Boutmy ................................... 358/86 |
| 4,648,128 | 3/1987 | Saka et al. ......................... 455/327 X |
| 4,675,732 | 6/1987 | Oleson ............................... 358/86 X |
| 4,700,230 | 10/1987 | Pshtissky et al. ................ 455/349 X |

FOREIGN PATENT DOCUMENTS

| | | |
|---|---|---|
| 0081885 | 6/1983 | European Pat. Off. . |
| 2330628 | 1/1975 | Fed. Rep. of Germany . |
| 2127257 | 4/1984 | United Kingdom . |
| 2143691 | 2/1985 | United Kingdom . |

OTHER PUBLICATIONS

Magazine article; "44 Satellite TV Systems You Can Buy Now," Popular Science, 1984, p. 93, et seq.

Primary Examiner—Robert L. Griffin
Assistant Examiner—Ralph E. Smith
Attorney, Agent, or Firm—Roylance, Abrams, Berdo & Goodman

[57] ABSTRACT

A satellite TV system including a plurality of channel strips each including a tuner and a modulator matched to each other. The tuner selects the particular satellite signal and the modulator selects the particular channel on the TV. Both tuner and modulator circuits include a divide-by-two component which permits use of lower cost electronic components while producing high quality TV pictures or other outputs. Each channel strip is in the form of a plug-in module. A control box houses all of the plug-in channel strips and the other electronics.

10 Claims, 5 Drawing Sheets

CHANNEL STRIP FOR USE IN A SATELLITE/HYBRID TELEVISION SYSTEM

REFERENCE TO RELATED APPLICATION

This patent application is a continuation-in-part of my co-pending U.S. patent application Ser. No. 807,238, filed Dec. 10, 1985, entitled "SATELLITE/HYBRID TELEVISION SYSTEM," assigned to the same assignee as the present application, now U.S. Pat. No. 4,675,732 issued June 23, 1987; the entire disclosure and prosecution of which is hereby incorporated by reference as if here set forth in full.

FIELD OF THE INVENTION

The present invention relates to television entertainment, more specifically it relates to a system for receiving TV signals from satellites in space and to a self-contained system for simultaneously delivering a plurality of TV and the like signals to a plurality of television sets in various combinations. Still more specifically, it pertains to an improved single channel strip for use in such a system.

BACKGROUND OF THE INVENTION

In recent times, satellite systems, known as "dishes," have become increasingly popular. These satellite reception systems enable the owner to view a wide variety of television signals which are broadcast from the earth up to repeater satellites and then back down to the earth. The electronics associated with these reception dishes have become increasingly more sophisticated and more powerful so that at the present state-of-the-art a dish merely four feet in diameter can "pull in" adequately strong signals from certain satellites which are acceptable for home TV viewing.

Multiple TV sets in a single location served by a single dish are also becoming increasingly more popular. This can be found in hotels where many room TVs, up to hundreds and even thousands, can be served by a single satellite dish, as well as in homes where two television sets are to be connected to a single dish. As many as four, five, or even six television sets in one home are fairly common.

Another recently developed phenomenon in television entertainment is the use of the video cassette recorder (VCR) for home use. In a home having several television sets, it would be desirable to direct the VCR signal to any one or to several of the television sets in the home. At present, the common arrangement is to have the VCR more or less permanently wired to one of the home television sets.

Cable television is another option available to homes, hotels and the like wherein a large number of signals of high quality are delivered on an underground cable from a central supplier to the cable subscribers. Here again, in multiple TV installations, it would be highly desirable if the user could direct the cable signal to any one or to several of the television sets in the multiple television set installation.

Another application with which the invention is involved is the use of television cameras and receivers for alarm and surveillance purposes. This is often done in department stores, factories, hotels, and to an increasing extent, also in the home. The integration of such surveillance, alarm and the like systems into the regular TV intended for entertainment purposes, at the present time, is either rudimentary or non-existent. That is, separate television receivers are usually provided for alarm and entertainment purposes.

Another aspect of the prior art in regard to satellite television is that the satellite signals are broadcast back to earth at an extremely high frequency, on the order of 4 to 12 gigahertz (GHz), and the frequency range at the television set itself is on the order of 100 MHz. This high frequency signal must be converted down to the standard television UHF frequencies to which the various channels of the television are pre-tuned. Accomplishing this with reasonably priced electronics suitable for the home market has been a problem in the prior art, and is solved in a unique manner by the present invention. The signal is demodulated, amplified, and delivered to the television in the form of a clear, sharp TV picture with good sound by the invention system, which is itself produced at a reasonable cost.

Another growing consumer product is the home video camera. Here again, the invention's integrated system will permit showing of home video made by such cameras on any one or any combination of the plurality of television sets served by the invention hybrid system.

Most satellite systems commercially available operate by extracting a single signal from a broad band of different signals received at the dish from the satellite. This naturally results in a system wherein a single television only can be provided with a single signal only at any one time. This is a severe disadvantage in that the costs are multiplied if several signals are desired to be used simultaneously.

OBJECTS AND ADVANTAGES OF THE INVENTION

The present invention provides an integrated system wherein all of the different signals broadcast from a particular satellite are made available at any or all of the plurality of television sets served by the invention system, in any combination.

The technology of the invention is also adaptable for use with signals other than television signals, for example data transmission systems wherein multiple signals must be delivered to multiple receiving points within a system served by a single piece of apparatus which embodies the teachings of the present invention.

The invention provides improved circuitry which permits the use of relatively inexpensive components to accomplish the demodulation and conversion of the received signals at a relatively low cost in equipment while maintaining the high quality of the signal at the receiving television set or other receiver.

The invention also includes means to accommodate many different inputs, including cable, VCR, standard broadcast, satellite, alarm and surveillance systems, video camera, etc., in such a way as to provide these different signals to any or all of the television sets or other receivers served by the invention system.

Another advantage of the invention is that it provides simple means built into the system to permit blocking out of particular television sets with respect to particular channels and to do so in any combination desired. For example, in a home environment the parents might wish to restrict the television sets used by the children from viewing certain channels at certain hours, or they might want to permit those TVs to receive certain signals only at certain hours of the day only. In a hotel environment, it may be desired to restrict certain rooms from receiving certain channels, for example, unless a fee is paid to see a movie or the like. The invention permits very simple accommodation of such selective blocking, timing of the blocking, and easy changing of the blocking, in any manner desired.

The invention system includes means to make it fail-safe against a power failure in regard to the programming. A memory with battery back-up is provided which will retain the programming during a power failure, thus obviating the need to reprogram after such an event.

Another advantage of the invention is the inclusion of means, under the control of the central controller, to reposition the dish to pick up different geostationary satellites automatically when a user changes from a channel on one satellite to another channel available on a different satellite.

Another advantage of the invention is that it lends itself to use with standard TV remote control technology as to channel selection, sound volume control, power on/off, etc. Further, the same remote control is relatively easily adapted to also perform the blocking functions remotely, which greatly facilitates changing of that part of the programming of the invention system.

Yet another advantage of the invention is that it provides a plurality of separate channel strips which fit into a housing containing other parts of the invention circuitry in such a manner as to greatly facilitate manufacture, assembly, flexibility in use, and repair of equipment embodying the invention. Each such strip is preassembled and the housing is provided with mating connections to join each strip to the housing, the computer, and the remainder of the circuitry. Overall, the approach is a kind of plug-in modular design, i.e., the channel strips are in the nature of plug-in modules. Further, each such single channel strip can have its own utility, essentially all by itself, i.e., it can be used alone in other environments.

SUMMARY OF THE INVENTION

The invention satellite/hybrid system, whether for television, data, or any other use, is characterized by lending itself to fabrication using state-of-the-art components throughout, with the exception of the unique tunable channel strips of the invention, described below.

A television system, used as an example of data and other systems with which the invention can be used, comprises a dish, means to position the dish, a small multipurpose computer programmed for use in the invention system, a signal distribution matrix, and a plurality of the unique channel strips of the invention designed to input the different satellite signals and all of the other signals such as standard broadcast television, cable, TV camera, surveillance, VCR, and the like, into the matrix for distribution to the various television sets or other receivers served by the invention system. The invention system also includes the necessary low noise down converters, amplifiers, splitters, coaxial cables, computer bus lines, and the like, which are all commercially available.

The unique channel strips of the invention are separate, prefabricated, subassemblies each of which includes a variable tuner, a filter, and a variable modulator. The two variable components, the tuner and the modulator, are under the control of the computer to permit selectivity of the signals received and providing of these signals as converted to preselected channels on the television set or sets being served by that particular channel strip.

These channel strips, because of their low cost construction and good performance of the necessary conversion from the high frequency at the satellite end to the relatively low frequency at the television or receiving end, are an important aspect of the present invention. The channel strips also lend themselves to other utility besides use in the invention system. For example, a very low cost, single channel TV receiver can be built around a channel strip according to the teachings of the invention. Such single channel low cost TVs might find utility in third world countries, in industrial applications, and the like. In addition, the invention channel strips can be easily modified for use in data handling and the like systems in addition to use in television type systems. The modular approach used to fabricate the invention channel strip and cooperating control cabinet even further enhances these advantageous aspects of the present invention.

BRIEF DESCRIPTION OF THE DRAWINGS

The above and other features of the invention will now be described in detail with reference to the accompanying drawings also forming a part of this disclosure in which.

DETAILED DESCRIPTION

Figure 1:
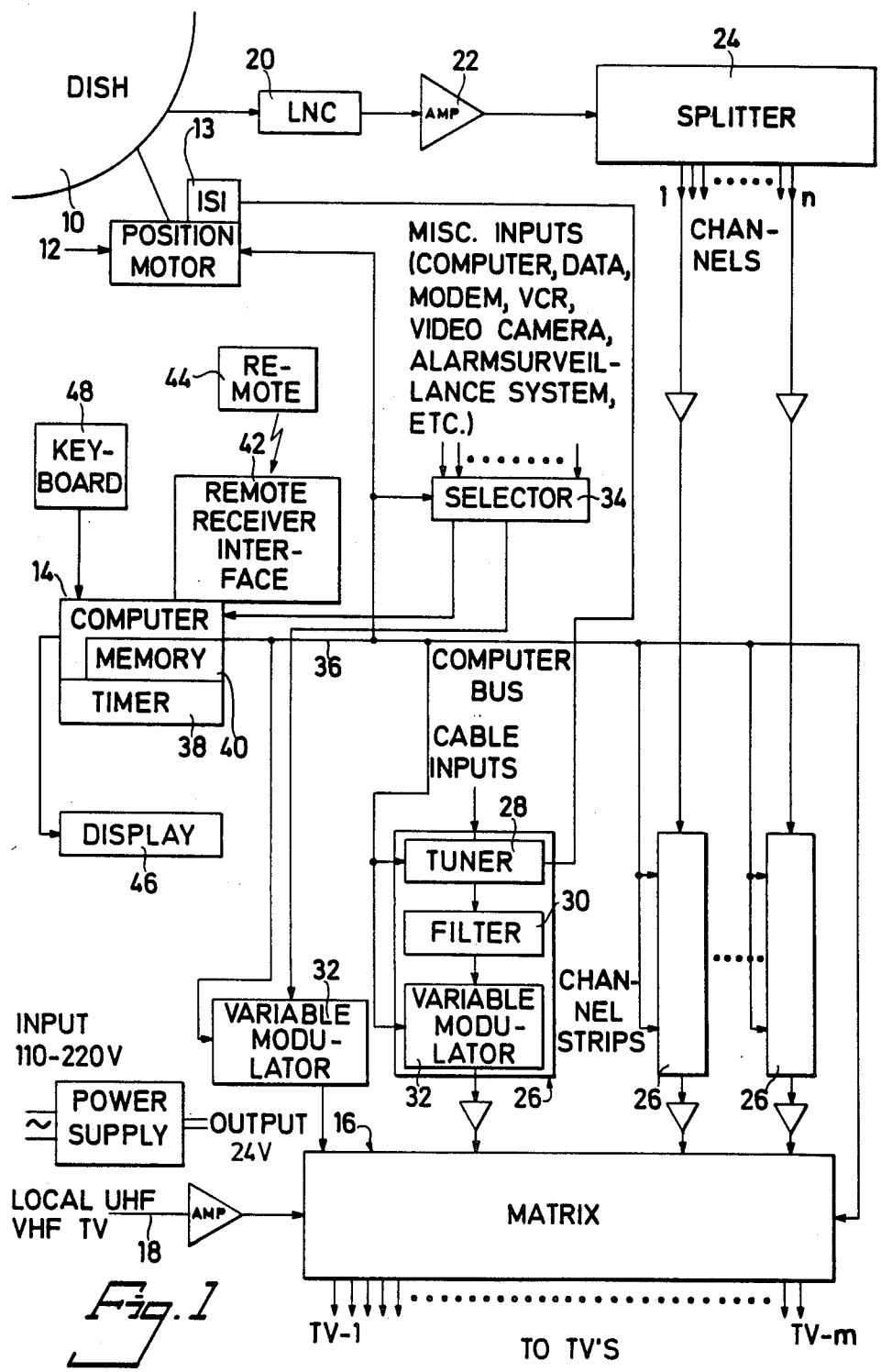
FIG. 1 is a schematic block diagram of the invention system as applied to satellite television.

Referring now in detail to the drawings, the invention system, shown for example applied to a television environment rather than to the equally applicable data handling or other environment, comprises a satellite receiving dish 10 of any conventional configuration. A positioning motor 12 is associated with the dish 10, as an optional feature. Control overall is provided by a computer 14 which may be a single electronic chip, or a commercially available small multipurpose digital computer programmed for use in the invention system. The invention is highly flexible as to the particular computer used for the control functions. A suitable power supply for the various components is shown at the lower left of FIG. 1.

The invention system also includes a main distribution matrix 16 to which the various television sets marked TV-1 through TV-M are connected, "M" indicating an indeterminate number of television sets which may be driven by the invention system.

Local UHF and VHF television, as from a conventional TV antenna, is delivered by an amplified line 18 into the matrix 16.

The satellite signal picked up at the dish 10 from a particular satellite to which it is directed by the positioning motor 12 is delivered via a low noise, block down converter and low noise amplifier combined component called an "LNC" which is indicated at 20 and is a conventional piece of satellite signal hardware. The output of the LNC, which contains signals corresponding to all of the channels received from the particular satellite is amplified at 22 and delivered to a splitter 24 wherein it is divided into the various individual signals corresponding to all of the signals being transmitted by that particular satellite. At the present state-of-the-art, this is a maximum of 24 channels, and the channels are marked 1 through N in FIG. 1 to indicate the indeterminate number, more or less than 24. Each channel operates through a channel strip 26.

"N" does not necessarily have to equal 24. For example, in a home where four television sets are to be serviced, more than four different satellite signals will never be required. In this case, N will be equal to four, and only four of the channel strips 26 will be provided for the satellite signals. See FIGS. 7-9, which shows just such a system, and the corresponding description below.

The positioning motor 12 is an option. Many satellite dishes are permanently aimed at one geostationary satellite, and this is acceptable to many consumers.

In addition, the invention lends itself to use with existing polarity reversal technology, which for purposes of the invention means that each channel strip can serve two channels, thus cutting in half the number of channel strips needed and cutting in half the number "N" in FIG. 1.

Figure 9:
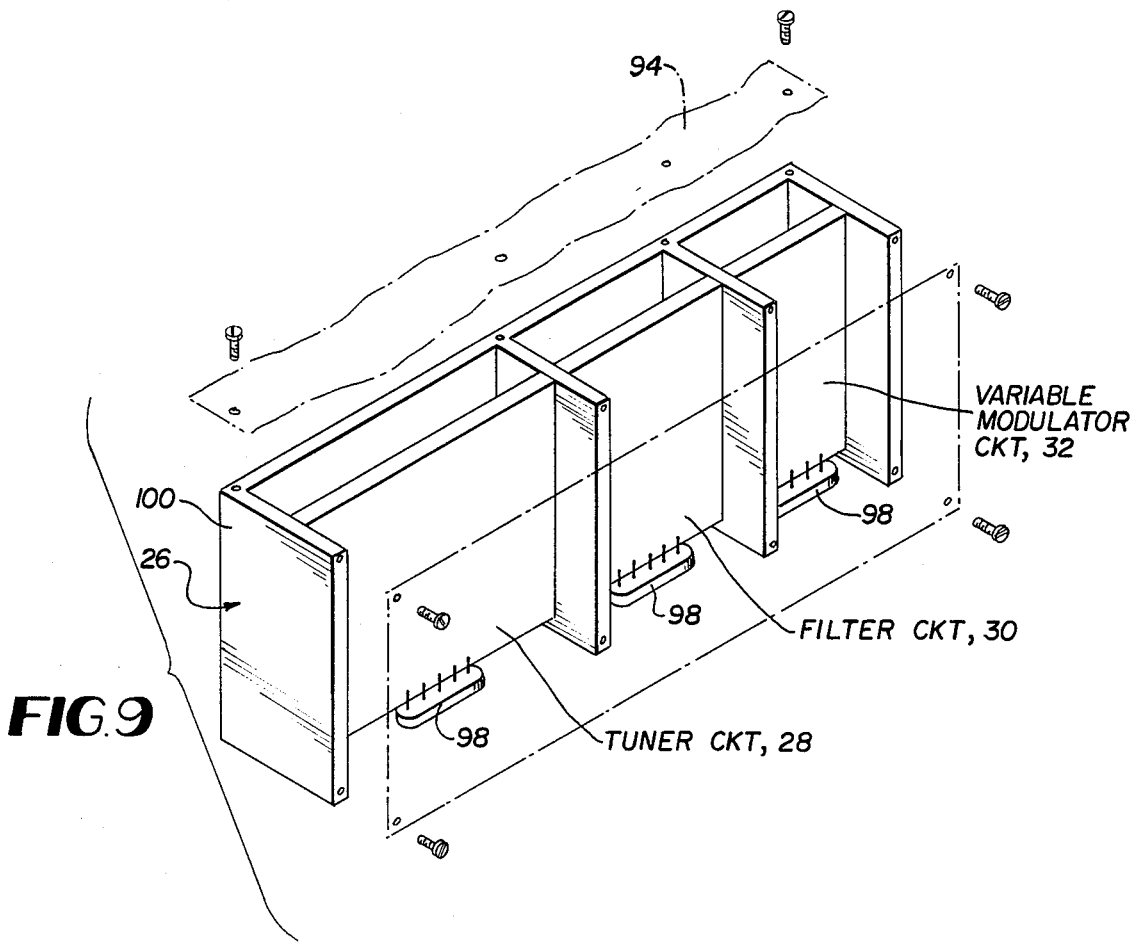
FIG. 9 is an exploded perspective view of a single channel strip as used in the control box of FIGS. 7 and 8.

Each channel strip 26 comprises a tuner portion 28, a filter 30, and a variable modulator 32. One of these channel strips, the one associated with the input of cable TV, is shown in FIGS. 1 and 9. The components 28 and 32 are shown in subsequent Figures and are described in greater detail below.

Another variable modulator 32 is shown feeding into the matrix 16, the input to which is from a selector 34. Selector 34 selects from all of the various other possible inputs, marked on the drawing as "misc. inputs," including computer, data, a modem associated therewith, VCR, camera, alarm and surveillance systems, and the like. Of course, if a system were needed where more of these miscellaneous inputs where to be input into matrix 16, then a corresponding number of modulators 32 would be provided, together with a multiple selector 34. Computer 14 and selector 34 are interconnected as shown. This lead would be used, for example, where, with no one at home or in attendance, information or instructions stored in computer memory 40 can order the computer to operate the selector to operate modulator 32 at a specific time or within a specific time after some particular signal arrives at selector 34.

A multiple branching computer bus line 36 is provided to control the system. Specifically, it controls the dish position motor 12, the selector 34, the tuner 28, and the variable modulator 32 in all of the channel strips 26, as well as the additional variable modulator 32 associated with selector 34. The computer includes a conventional timer portion 38, and a battery back-up and a memory 40. A remote receiver 42 which operates with a remote control 44 is also provided. The remote control 44 and the receiver 42 are shown in greater detail in FIGS. 5 and 6 and are described in greater detail below. Finally, a display 46 and a conventional manually operated keyboard 48 which corresponds in function to the remote control 44, are also provided in association with the computer 14.

The purpose of the memory 40 is to retain the programming in the event of a power failure, and this technology is well established in the computer arts. The timer is in the nature of a clock radio to cause the turning on and off of various ones of the television sets at a particular channel at particular times as desired. This will permit the owner to use the invention system in place of a clock radio, and will permit the user to wake up to television rather than to radio. The keyboard 48 will include all of the functions of the remote control 44, as well as additional functions, the situation being analogous to a standard remote control television wherein the controls are duplicated on the television set and on the remote. The difference in this case is that the control pertains to the controls of the computer 14 for the system overall, rather than to the controls for a single television set.

The timer cooperates with the computer to control the blocking including the timing thereof. For example, TV number 3 can receive only certain channels (or cannot receive certain channels), and is only operative overall only at certain times. This assures that the children's room TV (number 3) can "see" only programming selected by the parents and can do so only at times selected by the parents.

Figure 2:
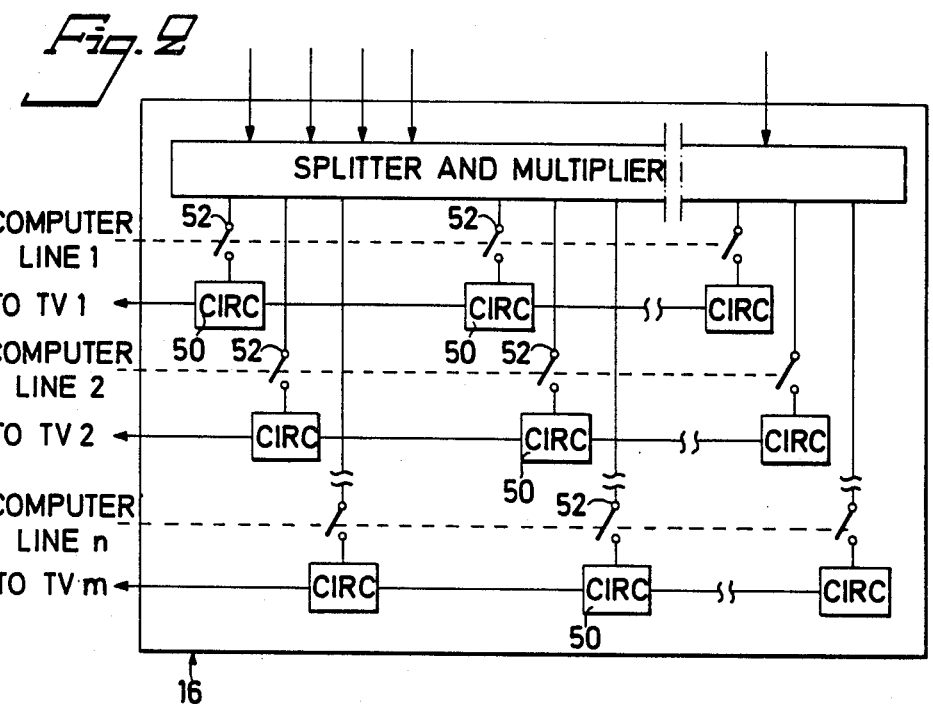
FIG. 2 is a schematic diagram of the matrix shown in FIG. 1.

Referring now to FIG. 2, the matrix 16 is shown in detail. Matrix 16 has the inputs along the top and the outputs along the left side. It basically comprises a component which will receive the signals from the various inputs including the strips 1-N, and distribute them under control of the computer to the television sets 1-M. The matrix is built around a number of circulators 50, equal in number to the number of inputs times the number of outputs. A computer line marked with the number 1-M, one associated with each television set 1-M, is provided to control switches 52 associated one with each one of the circulators 50. The computer control lines are indicated by the extension of the computer bus line 36 shown in FIG. 1 and enter matrix 16 at the right-hand side thereof.

It is this matrix array which permits the full versatility of the invention. That is, for example, if the number of TV sets, the number M, equals 100, using the matrix of FIG. 2 all 100 sets could be watching a single station. This situation frequently arises, i.e., a major sporting event. Likewise, by use of the switches 52 under control of the computer 14, each of the TV sets could watch a different one of the available inputs. Any sort of combination of the TV sets with respect to the inputs is possible using the fully versatile matrix 16 of FIG. 2.

Figure 3:
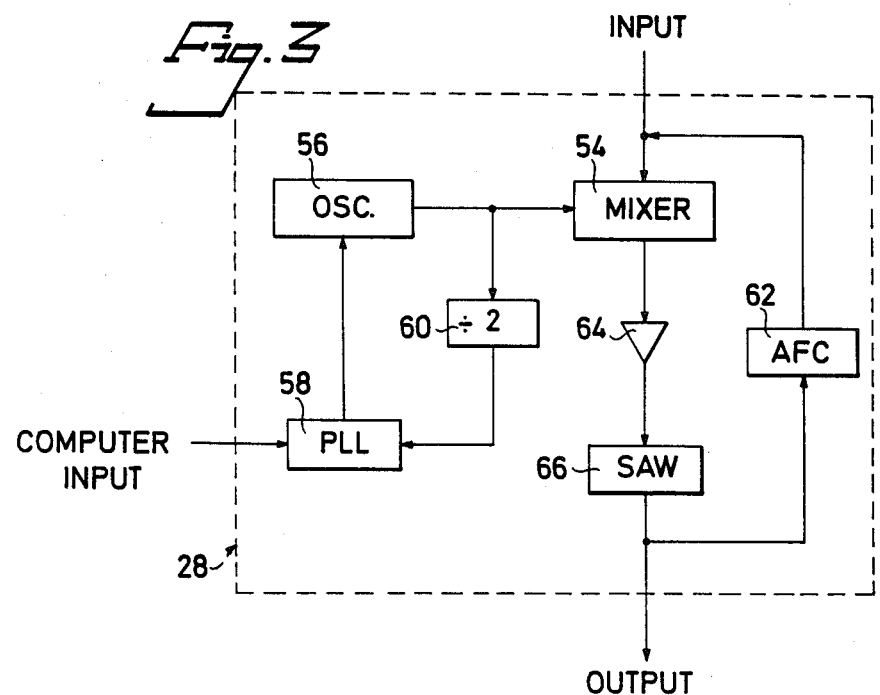
FIG. 3 is an electronic schematic diagram of the tuner portion of one of the channel strips of FIG. 1.

Referring now to FIG. 3, the tuner portion 28 of each of the channel strips 26 is shown in detail. This tuner portion comprises a mixer 54 the output of which is a composite of the output of an oscillator 56 under the control of a phase locked loop (PLL) 58, and a divide-by-two circuit 60. The three elements 56, 58, and 60 are in a closed loop arrangement as shown, with the computer input entering the tuner at the PLL 58. The second input to the mixer 54 is a feedback from the output line directed into the input line by an automatic frequency control (AFC) 62. The output of the mixer is directed through an amplifier 64 and through a saw filter 66 to the filter 30 (see FIGS. 1) and the modulator 32 (see FIG. 1 and 4) to finally input the televisions or other points of use.

An important advantage of the invention is its use of standard relatively low cost components to produce a high quality TV or other output signal, and to do so in the invention channel strip 26, to further enhance the economic advantages of the invention. An important facet of how this is done comprises the circuitry shown in FIG. 3, and in particular the divide-by-two block 60.

A conventional PLL cannot handle the high frequency incoming signals which are on the order of one GHz. By dividing the incoming signal as handled in the mixer 54 with the use of the divide-by-two circuit in the PLL sub-loop, the system according to the invention can use conventional and less expensive electronic components at that point.

With the use of this loop and the divide-by-two element 60, the signal delivered from the mixer 54 to the saw filter 66 is always at 600 MHz, within a tolerance of plus or minus 18 MHz. This manner of operation is the same for the tuner section of all of the channel strips as used in the TV environment.

Another element of the invention system which allows it to produce a low cost high quality signal is the amplifier 64 in circuit between the mixer 54 and the saw filter 66. The nature of the particular saw filter used is such that it has a 20 Db loss. This loss is corrected for in the amplifier 64. This is so even though the amplifier 64 appears to be upstream of the saw filter 66, since the entire system works in a feedback mode via the AFC 62. Filter 66 acts to eliminate "hiss" and evens the signal strength in the band width of interest.

In this description and on FIG. 2, the element 52 is called a "switch." Of course, this is used in the functional or descriptive sense only. In actual practice, a transistor will be used, or even an array of relays could be used to make up the matrix 16. All of these equivalents are well within the expertise of those skilled in these arts.

Figure 4:
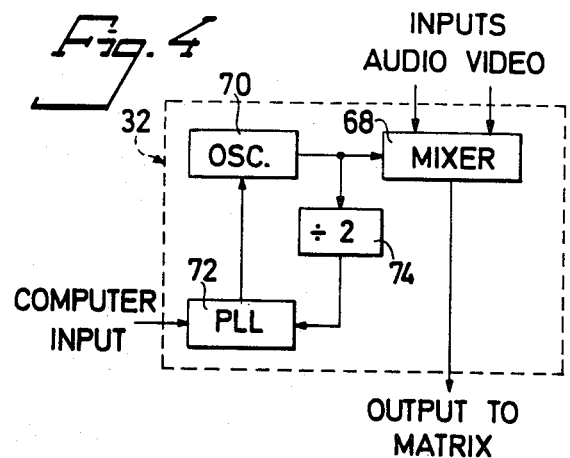
FIG. 4 is an electronic schematic diagram of the modulator portion of the invention channel strip.

FIG. 4 shows a blow up of the modulator 32 in each of the channel strips. The inputs are from the filter 30 and comprise separate audio and video inputs for the television environment. The modulator 32 includes an array of parts analogous to the parts 54–60 of the tuner 28 as described above and as shown in FIG. 3. Thus, the modulator 32 includes a mixer 68, an oscillator 70, a PLL 72, and a divide-by-two component 74. These are arranged in the same sort of closed loop circuit feeding into the mixer 68 under the control of the computer input, the input being fed into the PLL 72. The AFC, amplifier and saw filter 62, 64, and 66 are not required in the modulator.

Here again, as in the case of the tuner 28 of FIG. 3, the divide-by-two element 74 permits the use of substantially less expensive components in the modulator 32 while allowing the production of a high quality television or other output signal into the matrix.

Figure 7:
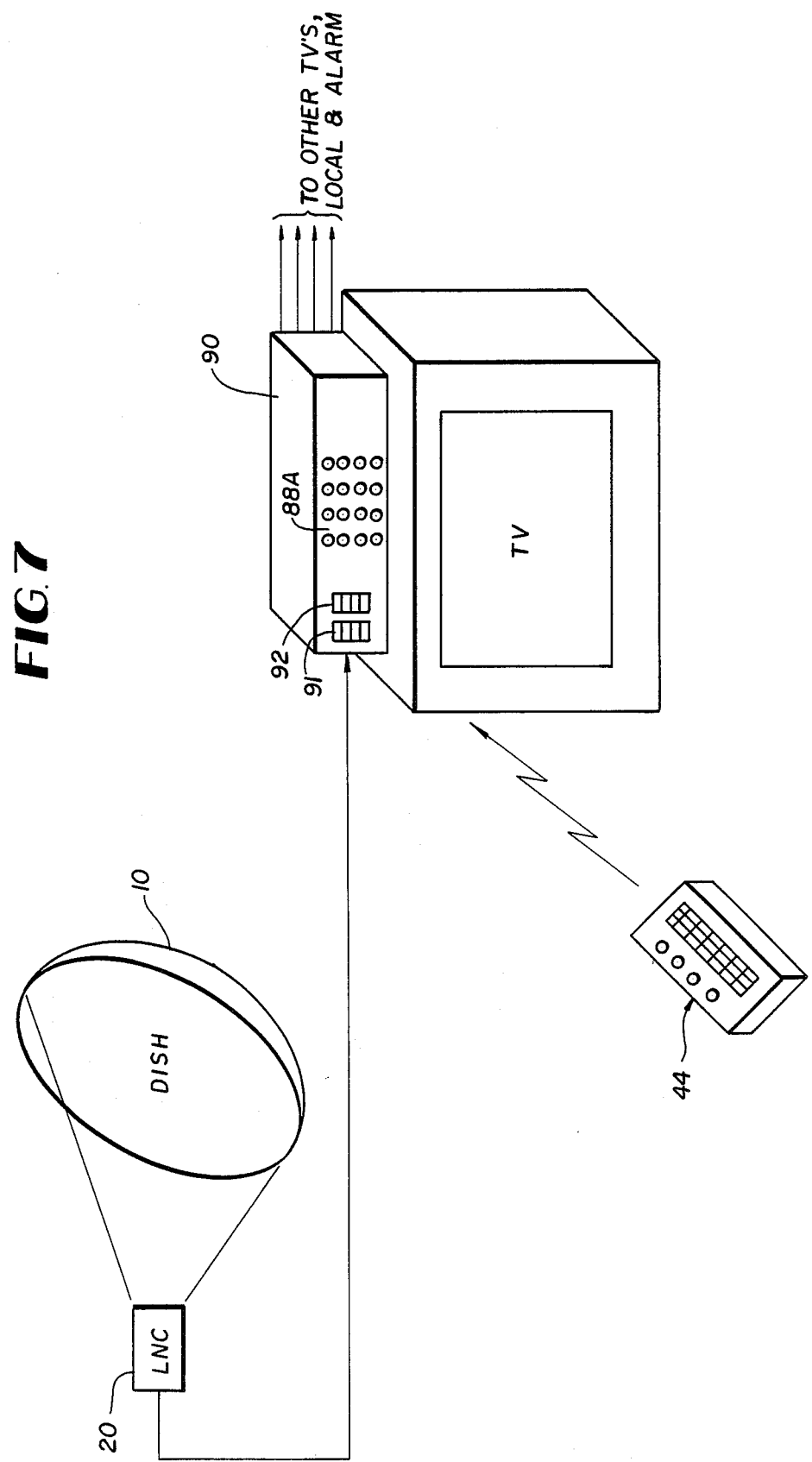
FIG. 7 is a schematic showing of an embodiment of the invention as used in a typical home installation wherein some parts shown in FIGS. 1–6 are used.
Figure 8:
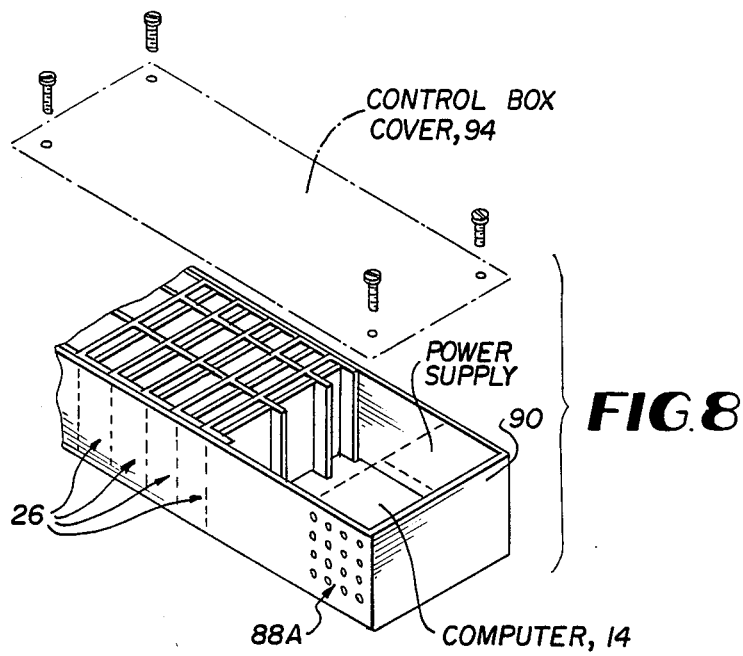
FIG. 8 is a partial exploded perspective view of the control box shown in FIG. 7.

The interaction of the tuner 28 and the modulator 32 is, putting it most simply, that the tuner 28 selects the particular channel pre-tuned on the television to which that particular signal will be directed. Thus, theoretically, for a smaller system to drive, for example, four home television sets, as shown in FIGS. 7–9 and as described below, one would not need more than four channel strips since each of the variable modulators 32 is tuned for a particular television channel. However, for larger systems such as in a hotel where hundreds or even thousands of television sets are to be supplied, then a number of channel strips equal to the number of signals, which is usually 24, is required in order to provide each TV in the hotel with the full ability to tune in to any one of the channels, and do so in all combinations, as discussed above.

Further, in a home system where a maximum of let us say four television sets are to be driven, it is possible to use only two channel strips by the use of a polarity reverser in the LNC at the antenna, the line containing the elements 20 and 22 in FIG. 1.

Figure 5:
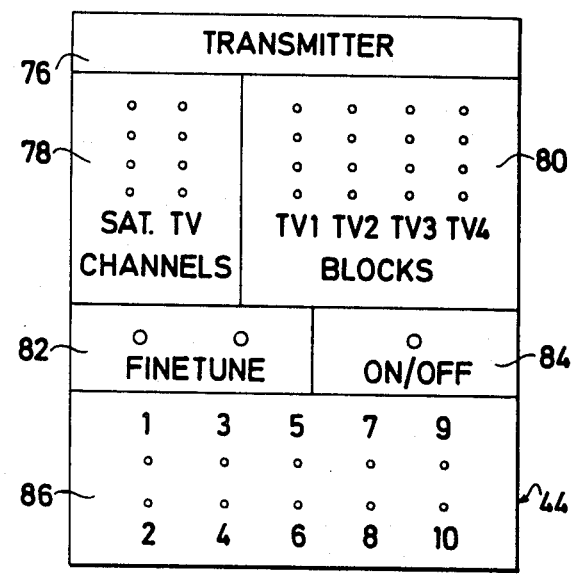
FIG. 5 is a somewhat schematic showing of a remote control which can be used with the invention system of FIG. 1.
Figure 6:
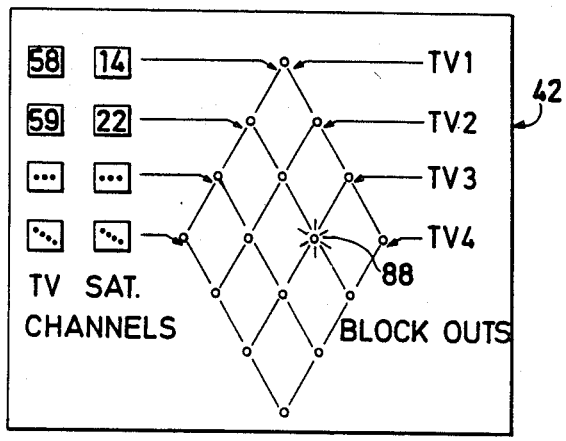
FIG. 6 is a view of the face plate of the remote control receiver associated with the invention system of FIG. 1.

FIGS. 5 and 6 illustrate the remote control feature of the invention. FIG. 5 shows the hand held remote control device 44, and FIG. 6 shown face of the device which responds to the signals from the remote control 44 and which is associated with the computer and the TV. Some of these features appear again in FIGS. 7 and 8.

The remote 44 comprises a transmitter end 76 which sends out signals which are received at the TV in the conventional manner. The device 44 includes a first field 78 for TV channel selection, another field 80 for blockage of particular channels and sets, a field 82 for fine tuning, a main power on/off switch 84, and a selector pad 86.

The remote 44 controls the computer to control the invention functions, and thereby also controls the TV in the conventional manner. That is, by using the selector field 86, any particular channel can be selected by pressing the appropriate button on the field 78.

The remote operator 44 includes standard remote control TV technology. Device 44 produces a burst of energy for each signal and this is received by appropriate receiving means associated with the computer to control the corresponding function in the control panel shown in FIG. 6, and described below. In building the remote operator 44, it is possible to buy a commercially available single chip which will provide a large array of functions, on the order of 65 by 65 functions, which is considerably more than the number of functions needed by this embodiment of the invention as illustrated by the remote operator of FIG. 5. In fact, the remote operator of FIG. 5 uses only 37 buttons as indicated on the front of the operator.

Referring to FIG. 6, the diamond-shaped array of circles represent light emitting diodes (LEDs) each of which when lit indicates that that particular channel for that particular television is blocked out. For example, FIG. 6 shows one of the sixteen LEDs 88 lit which indicates that television number 3 is blocked out from viewing TV channel 59 which corresponds to satellite channel 22. The LEDs corresponding to 88 are turned on and off, and the corresponding blockages are accomplished using the "switches" 52 of FIG. 2 by means of the remote operator shown in FIG. 5. That is, by using the various fields and buttons of the remote operator, any one of the various lights 88 can be made to be lit or not lit to thereby block or unblock any particular television from any particular channel.

The array of FIG. 6 is shown designed for four TVs. If three or five or some other number of TVs was used, then the array would be adjusted accordingly. In a larger system, such as in a hotel, then the "address" would be determined by using the field 86 to in effect "dial" the particular channel on the TV and the particular satellite channel desired to be seen. In any event, the satellite selection channels have to do with controlling the tuner 28, and the TV selection buttons have to do with controlling the modulator 32, as described above.

FIGS. 5 and 6 illustrate this part of the novelty of the invention, namely the interaction of the remote control with the computer to control the channel strips of the invention.

It is also within the teaching of the invention to omit the remote control feature. That is, all of this tuning could be done manually rather than by remote control. In such event, the face plate shown in FIG. 6 could include suitable knobs with detents (rather than fine tuning), since detents are more desirable. The provision of the AFC block 62 in the tuner 28 of FIG. 3 eliminates the need for fine tuning the channel. This feature is also indicated by the keyboard 48 of FIG. 1.

The memory 40 shown associated with the computer 14 in FIG. 1 interfaces at this point. An advantage of the invention is that this memory will permit, in the event of a power failure, all of the programming as to which channel and which television set and so on to be retained, and normal operation to be resumed without any interruption and without any need for reprogramming as soon as normal power is reinstated. This is an important advantage of the invention and utilizes state-of-the-art battery back-up memory but in this new environment.

Referring now to FIGS. 7, 8, and 9, there is shown the invention as applied to a four TV set home system. FIG. 7, as do FIGS. 8 and 9, show many of the same parts shown in FIGS. 1-6 and described above, and all such parts carry the same reference numerals. Shown in FIG. 7 is a control box 90. This box 90 includes all of the electronics required by the system of FIG. 7, including various of those portions shown in FIGS. 1-6. Details of the contents of the control box 90 are shown in FIG. 8, and FIG. 9 shows a detail view of one of the channel strips 26. The LEDs 88 shown in a diamond array in FIG. 6 are shown in a rectangular array in FIG. 7 and are indicated by the reference numeral 88A because of this difference. Two displays 90 and 92 are used to indicate the satellite channel and TV channel then in use, in a manner analogous to that shown in FIG. 6. The outputs of the control box 90 are indicated by the four arrows on the right-hand side, which indicate signals directed to other television sets, a local system, alarm systems, and other features, all as described above in regard to the preceding figures.

Referring now to FIG. 8, a broken-away portion of the control box 90 is shown, the right-hand side being removed indicating that other equipment including portions shown in FIG. 1 are also included within the control box. In this particular home application of the invention, four of the channel strips 26 are shown in place. It is possible only two strips could be used if polarity reversal technology were also employed, as described above. The cover of the last channel strip 26 has been removed to conform FIG. 8 to FIG. 9. The cover 96 for the channel strips is shown in phantom in FIG. 9. Likewise, the cover 94 for the control box overall is shown in phantom in FIGS. 8 and 9. The right-hand side of the control box shows the computer 14 and the power supply in place, which is indicative of all of the parts located within the control box 90. Suitable screws are provided to hold the covers 94 and 96 in place in a removable manner in the usual way.

Referring now to FIG. 9, the modular character of each control strip 26 is shown. The control strip is built around a block 100 having a main rear wall and four short divider walls extending at right angles thereto. These four short walls define three compartments, one of which is occupied by the tuner circuit 28, a second by the filter circuit 30, and the third by the variable modulator circuit 32. Conventional plug and socket arrangements indicated at 98 are provided in the base plate of the control box 90 to permit the individual channel strips 26 to be readily inserted and removed as needed for changes, tuning, repair, and assembly.

The short walls in the element 100 serve the dual function of physically locating the various circuits in their respective portions of the modular channel strip 26, and in addition, serve as electrical insulation between these channel strip circuit portions to prevent "cross-talk" and the like undesirable effects that could result from the proximity of these sensitive portions of the circuit to each other.

The member 100 is preferably made by extrusion processes from suitable materials, such as aluminum and certain grades of plastic. Suitable holes are provided as indicated to permit detachment of the covers 96 and 94 to the array of the channel strips 26 when mounted in the box 90.

Thus, it can be seen that the invention's modular type of channel strip 26 as shown in FIGS. 8 and 9 lends great versatility to the invention channel strip and facilitates its use and the economies to be achieved by the manufacturer and the user.

While the invention has been described in detail above, it is to be understood that this detailed description is by way of example only, and the protection granted is to be limited only within the spirit of the invention and scope of the following claims.

What is claimed is:

1. A satellite TV system including a plurality of channel strips, said system being adapted to supply a plurality of TVs comprising a dish antenna for receiving satellite TV signals, said plurality of channel strips receiving input signals including individual ones of said satellite TV signals, a control computer, a signal distribution and control matrix between said plurality of channel strips and said plurality of TVs supplied by the system, each of said strips comprising a series array of a tuner circuit and a modulator circuit, said tuner and modulator circuits being matched to each other, said tuner circuit being matched to the input of said channel strip and said modulator circuit being matched to the output of said channel strip, a control box, each said channel strip being made in the form of a prefabricated module, said modules and said control box including means to mount said channel trips in said box in an easily removable plug-in manner, and said computer controlling said channel strips to match a particular input signal to a particular pre-tuned TV channel frequency on a particular TV.

2. The system of claim 1, and means to remotely control said computer.

3. The system of claim 2, and display means associated with said remote control means, said display means including an array of LEDs to indicate which TVs of said plurality are blocked from receiving which input signals.

4. The system of claim 1, and means to input signals other than said satellite signals including local TV signals, VCR signals, video camera signals, data, and the like for distribution to said TVs.

5. The system of claim 1, and said matrix including switch means controlled by said computer to block selected ones of said TVs from receiving selected ones of said input signals.

6. The system of claim 1, and timer means associated with said computer.

7. The system of claim 1, and motor means to control the position of said dish antenna, and said computer controlling said motor means.

8. The system of claim 1, and battery back-up means associated with said computer for retaining the computer programming in the event of a power failure.

9. The system of claim 1, each of said channel strip tuner and modulator circuits also being matched under the control of said computer to a particular incoming satellite signal and said modulator also being matched under the control of said computer to a particular pretuned TV channel frequency.

10. The system of claim 1, each of said channel strips being made in the form of a said prefabricated module, and means to mount said control computer in said control box.

* * * * *